United States Patent [19]

Walters

[11] 4,060,170
[45] Nov. 29, 1977

[54] TIRE MOUNT-DISMOUNT MECHANISM

[75] Inventor: David F. Walters, Royal Oak, Mich.

[73] Assignee: The United States of America as represented by the Secretary of the Army, Washington, D.C.

[21] Appl. No.: 730,919

[22] Filed: Oct. 8, 1976

[51] Int. Cl.² .............................................. B60B 29/00
[52] U.S. Cl. ................................ 214/331; 254/93 HP
[58] Field of Search ............... 214/330, 331, 332, 333, 214/334; 254/93 HP

[56] References Cited

U.S. PATENT DOCUMENTS

| | | | |
|---|---|---|---|
| 2,695,717 | 11/1954 | Crow | 214/330 |
| 2,804,222 | 8/1957 | Elling | 214/330 |
| 2,804,223 | 8/1957 | Bogdanowski | 214/330 |
| 2,910,201 | 10/1959 | Finn | 214/330 |
| 3,799,504 | 3/1974 | Vaughen | 254/93 HP |
| 3,990,681 | 11/1976 | McKeen, Sr. | 254/93 HP |

Primary Examiner—Lawrence J. Oresky
Attorney, Agent, or Firm—Peter A. Toucher; John E. McRae; Nathan Edelberg

[57] ABSTRACT

A pneumatic power assist mechanism for supporting heavy truck tires during installation on or removal from a truck or similar vehicle. The mechanism comprises an inflatable pillow that can be pressurized to slightly elevate a tire cradle means to a position in which the tire weight is transferred from the vehicle axle to the cradle means. The cradle means is slidably guided for transporting the cradled tire laterally toward or away from the vehicle. In a preferred embodiment the cradle means consists of two rollers that are oriented to permit rotation of the heavy tire about its axis, as for example when it is necessary to align holes in the wheel with studs projecting from the axle.

1 Claim, 5 Drawing Figures

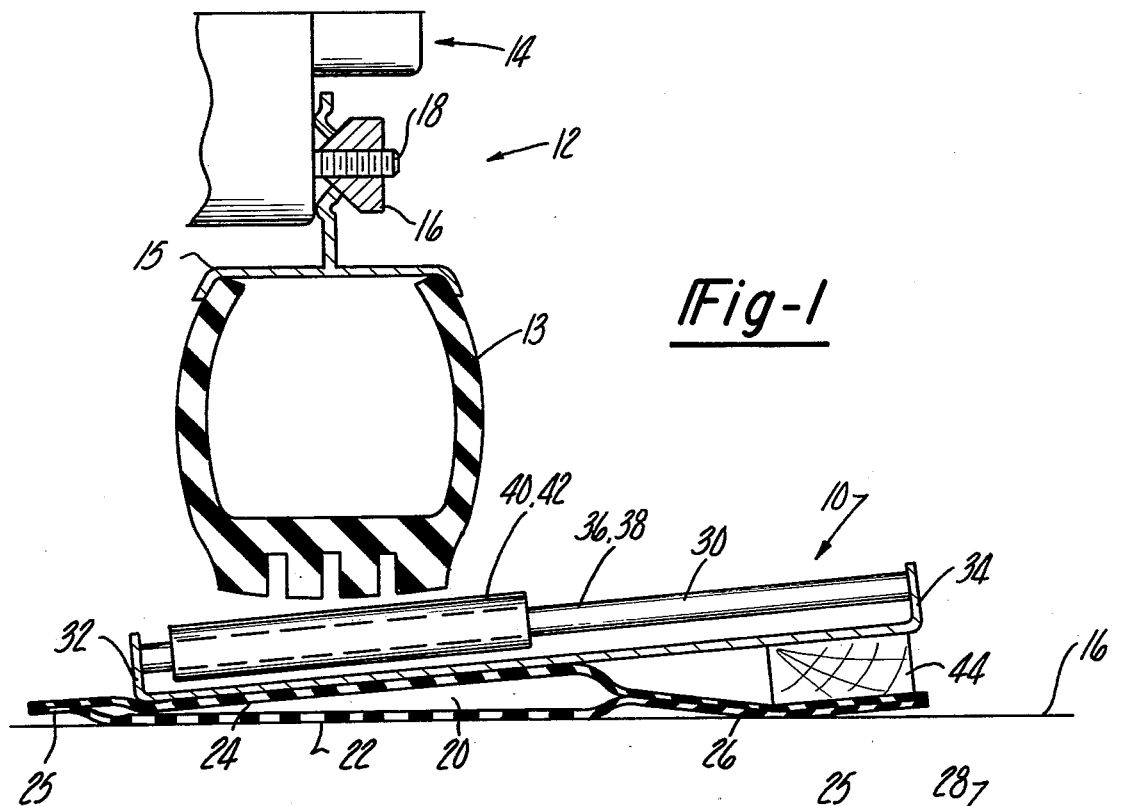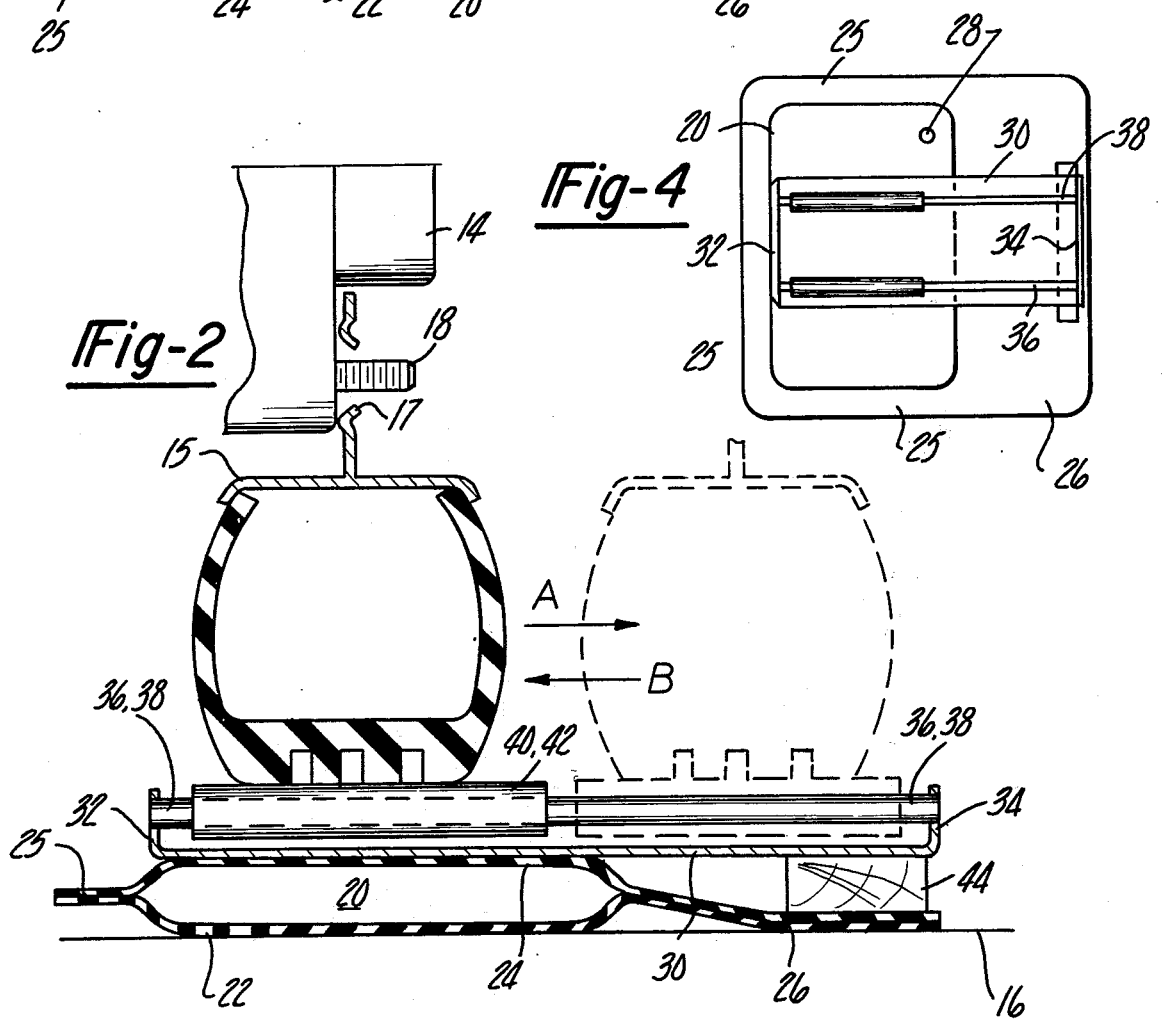

TIRE MOUNT-DISMOUNT MECHANISM

The invention described herein may be manufactured, used, and licensed by or for the Government for governmental purposes without payment to me of any royalty thereon.

BACKGROUND AND SUMMARY OF THE INVENTION

Removal and replacement of heavy truck tires, weighing upwards of 400 pounds, is sometimes difficult, especially when the vehicle happens to be located on rough or irregular terrain. In maintenance depots special lift trucks or wheeled jacking dollies are sometimes used to change heavy tires, but such devices are usually not available or usable in the field.

The present invention contemplates a pneumatic tire-support mechanism that can be operatively positioned beneath a heavy truck tire under adverse terrain conditions, such as mud, snow, gravel, rough or sloping terrain, etc. Special mechanism features include portability, compactness, light weight, low cost, minimum number of moving parts, and construction ruggedness.

THE DRAWINGS

FIG. 1 is a sectional view taken through a preferred embodiment of the invention.

FIG. 2 is a view in the same direction as FIG. 1, but with the mechanism energized to support the tire weight.

FIG. 4 is a top plan view of the FIG. 1 mechanism taken on a reduced scale.

Figure 3:
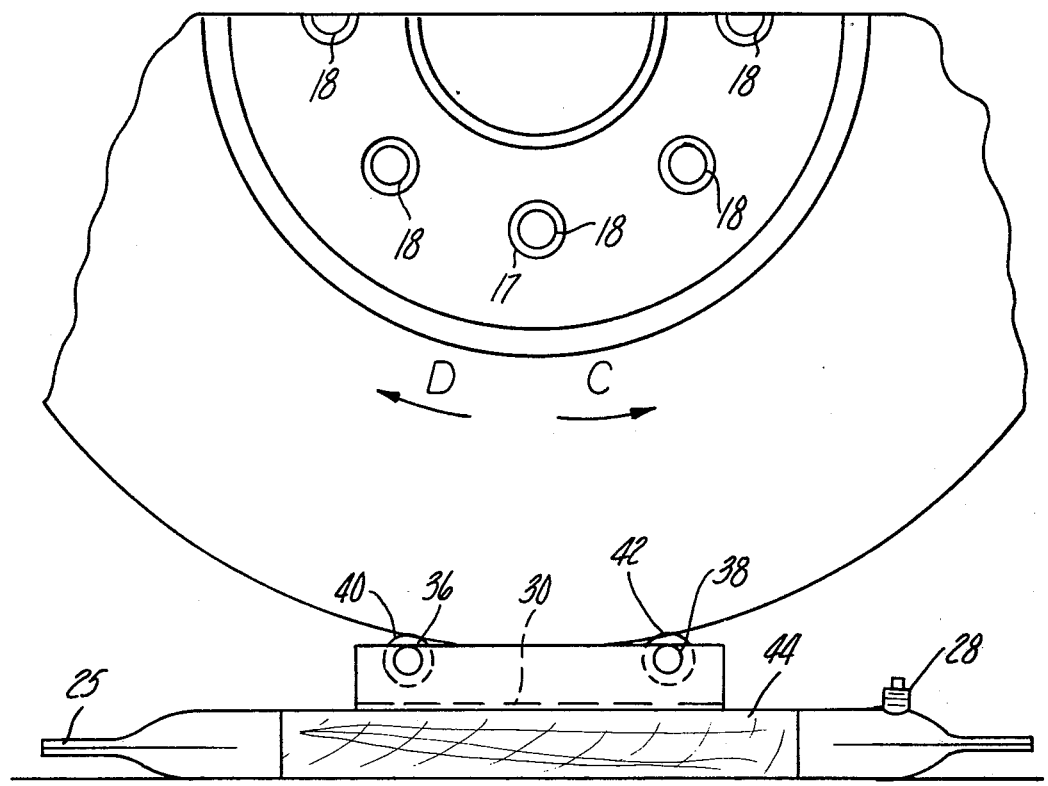
FIG. 3 is a right end view of the FIG. 2 mechanism.

FIG. 1 illustrates a tire mount-dismount mechanism 10 arranged to underlie a wheel-tire assembly 12 carried by the vehicle axle 14. As seen in FIG. 1, axle 14 is raised by a conventional jack mechanism (not shown) so that tire 13 is spaced above the terrain surface 16, thereby enabling mechanism 10 to be slidably inserted beneath the tire.

Mechanism 10 includes a deflatable-inflatable pillow 20 formed by two rubberized fabric sheets 22 and 24 bonded together at their peripheral edges 25. The rightmost sections of the bonded sheets are extended beyond the pillow to form a flap area 26. A conventional tire valve 28 (FIG. 3) is connectable to a tire pump or compressed air hose (not shown) to inflate the pillow from its FIG. 1 deflated condition to its FIG. 2 inflated condition. Deflation can be accomplished with valve 28 or a second valve, not shown.

Located on the upper face of sheet 24 is a flat metal base plate 30 having two upturned flanges 32 and 34 that serve as anchorages for two parallel guide rods 36 and 38. Elongated rollers or sleeves 40 and 42 are freely slidable and rotatable on the rods; i.e. each roller can rotate around the rod axis and/or slide along the rod length to or from the position shown in FIG. 1.

The right outboard end of base plate 30 carries a depending foot structure, herein shown as a thickened wooden plank 44. Plate 30 and plank 44 may be permanently affixed to fabric sheet 24, as by bonding; alternately the plate and plank may merely rest on the sheet or be detachably connected to the sheet, as by straps or other detachable connectors.

For purposes of explaining how the mechanism is used it will be assumed that the wheel-tire assembly of FIG. 1 is a blown-out defective assembly weighing upwards of b 500 pounds, and that it is desired to remove the wheel-tire assembly from the vehicle axle for replacement purposes. Prior to jacking up the vehicle axle 14, the lug nuts 16 will be loosened from the wheel studs 18, but retained loosely thereon to prevent tipping or dislocation of the heavy wheel-tire assembly.

After axle 14 has been jacked up to the FIG. 1 position the mount-dismount mechanism is slid into position beneath the tire carcass 13, and the wheel lug nuts 16 removed from studs 18. Thereafter pillow 20 is inflated to the FIG. 2 condition, thereby transferring the weight of tire 13 and wheel 15 from the vehicle axle to the cradle-forming rollers 40 and 42. The pillow-inflating operation is discontinued when the lug nut holes 17 in the wheel are centered relative to studs 18. Such centering of holes 17 frees the hole edges from studs 18 and thereby precludes the wheel from hanging-up on the studs during movement in the arrow A direction. Unless the wheel-tire assembly is disengaged from the studs there will usually be so much frictional interference between the stud and wheel that one man cannot readily pull the wheel-tire assembly away from the axle; therefore complete weight transfer of the wheel onto rollers 40,42, and centering of wheel holes 17 relative to studs 18, are important.

As best seen in FIG. 3, rollers 40 and 42 are spaced apart so that when the mechanism is properly oriented relative to the wheel axis the rollers will be on opposite sides of the wheel vertical centerline. Rollers 40 and 42 will thereby act as a cradle mechanism to preclude undue instability of the wheel-tire assembly. FIGS. 2 and 3 illustrate the tire as it would appear when properly inflated. However, if the tire being removed from the vehicle is deflated (flat) then it will sink further onto and around the rollers. In that event it may be necessary to inflate pillow 20 further than shown in FIG. 2. Rollers 40 and 42 are at least as long as the tire tread width. The pillow-inflating operation should be continued until the edges of wheel holes 17 clear studs 18.

Removal of the wheel-tire assembly is accomplished by pulling or pushing the tire laterally away from the vehicle in the direction denoted by arrow A. During this operation rollers 40 and 42 slide along guide rods 36 and 38 in a relatively frictionless fashion; anti-friction balls (not shown) could be provided within sleeves 40 and 42, although experimental work to date indicates that such measures are not necessary. The weight of the wheel-tire assembly ensures that the tire will remain firmly on rollers 40 and 42 during the pushing-pulling operation. However the technician must restrain the tire against toppling over. FIG. 2 shows in dotted lines the approximate position that the tire must reach before it is clear of the vehicle fender and axle components. When the dotted line position is reached the wheel-tire assembly may be rolled off the cradle 40,42 in a direction normal to the plane of the paper (FIG. 2).

During at least the initial stages of the arrow A movement the movement should be approximately parallel to the vehicle axle so that the edges of wheel holes 17 will stay clear of studs 18. To attain the required parallel motion it is necessary that guide rods 36 and 38 be oriented parallel to the wheel axis; in most cases the rods would be oriented in a horizontal attitude. If the tire is flat and it becomes necessary to inflate pillow 20 to a greater extent than indicated by the FIG. 2, then the rightmost end of base plate 30 should be elevated. Such elevation can be accomplished in various ways, e.g. by inserting a second plank or spacer (not shown) beneath flap 26 in the zone directly below plank 44.

The above explanation relates to tire-dismount procedure. A tire-mount operation is carried out in generally the reverse operational sequence, i.e. the replacement wheel-tire assembly is rolled onto rollers 40 and 42, after which the wheel-tire assembly is pushed toward the axle in the direction designated by letter B (FIG. 2). Pillow 20 may be slightly inflated or deflated to put wheel holes 17 on the same general level as studs 18. To precisely position holes 17 relative to studs 18 it is very often necessary to rotate the wheel around its axis, as designated by arrows C or D in FIG. 3. In spite of the large weight of the assembly such rotation is possible because the rollers 40 and 42 are rotatable on their support rods 36 and 38. The tires are able to roll on the rollers without skidding or hang-up. After the wheel is located on the axle and the lug nuts 16 tightened on studs 18, pillow 20 is deflated and removed from beneath the tire.

Figure 5:
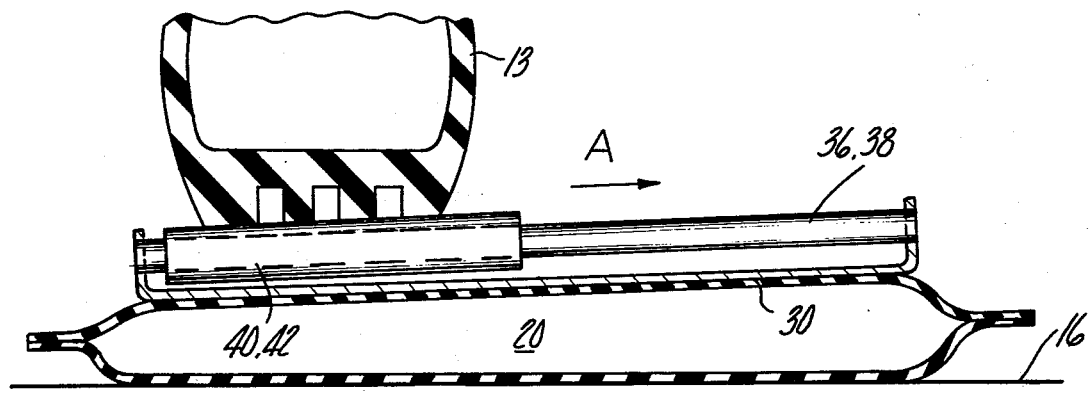
FIG. 5 is a sectional view taken through a second embodiment of the invention.

FIGS. 1 through 4 illustrate a preferred embodiment of the invention. A less preferred arrangement is shown in FIG. 5. The FIG. 5 structure uses the previously-described cradle-base assembly. However the pillow is elongated or enlarged to underlie the entire length of the base plate; the previously mentioned foot structure 44 is not used.

Operation of the FIG. 5 mechanism is the same as that of FIG. 1. However, under some circumstances the FIG. 5 device may not operate quite as smoothly. The difficulty lies in the fact that with the enlarged pillow there is a tendency of the base plate and cradle to tilt slightly under the load imposed by the tire-wheel assembly. As seen in FIG. 5 the inflation pressure within the pillow tends to fully inflate the unloaded right side area of the pillow, whereas the left area of the pillow remains relatively depressed because of the tire-wheel load. The cradle 40,42 therefore has to move slightly uphill during the initial stage of the arrow A movement; under some circumstances and conditions the edges of wheel holes 17 may hang-up on the studs 18.

The arrangement of FIGS. 1 through 4 does not have the "tilt" difficulty because the tire-wheel load is initially applied to the central area of the pillow. During the initial stage of the arrow A movement (FIG. 2) the load remains relatively close to the center point of the pillow; after wheel holes 17 are beyond studs 18 slight downward tilting of plate 30 and rods 36,38 is not particularly important. In any event foot structure 44 minimizes the amount of tilt.

It might be thought that the flexible nature of sheets 22 and 24 would make the structure fragile and unstable. Actually the flexible bag construction has proven to be relatively rugged. Additionally it conforms to terrain irregularities, such as occur in mud, rocky terrain, etc. The terrain-conformed pillow undersurface distributes the tire-wheel load onto a relatively large terrain area, so that unit area load forces are relatively low; accordingly the pillow has minimal tendency to sink or shift into loose terrain as the tire-wheel load is being applied to the pillow. The stability is such that the human operator has assurance that the mechanism will not suddenly shift position and cause a heavy 500 pound tire to topple onto his body.

The drawings show presently preferred arrangements. However it will be appreciated that some variations and changes may be made while employing the inventive concepts recited in the attached claims.

I wish it to be understood that I do not desire to be limited to the exact details of construction shown and described for obvious modifications will occur to a person skilled in the art.

I claim:

1. Vehicle tire mount-dismount mechanism comprising an inflatable-deflatable pillow (20) having a flap-like extension (26) adapted to rest on the terrain surface; an upstanding foot structure (44) of rectangular cross-section and of a given height carried on the extension remote from the pillow; a rigid base (30) extending along the upper surface of the pillow and onto the foot structure, whereby said base is conjointly supported by the pillow and foot structure; two parallel support rods (36 and 38) mounted on said rigid base in spaced apart relation; and cradle-forming rollers (40 or 42) individually slidable and rotatable on the support rods; the rollers having axial lengths slightly greater than the tread width of a vehicle tire; the support rods having lengths at least twice the lengths of the rollers; the mechanism being constructed so that the pillow and rollers are positionable directly beneath a tire on the vehicle, whereby the pillow can be inflated to elevate the rollers into weight-absorbing engagement with the tire; the support rods being of such length that the cradled tire can be drawn away from the vehicle to a position completely disengaged from the vehicle axle; the rollers being freely rotatable on the support rods whereby a cradled tire is enabled to roll on the roller surfaces as said tire is turned about its axis during a stud-hole alignment operation, said rigid base comprising a plate having upturned edges at opposite ends of the plate; said support rods having their ends anchored in holes in said upturned edges of the plate, whereby the plate-rod assembly functions as a single movable unit and further the said given height of the foot structure is approximately equal to the height of the pillow when said pillow is inflated.

* * * * *